United States Patent
Choi et al.

(10) Patent No.: US 10,887,770 B2
(45) Date of Patent: *Jan. 5, 2021

(54) MOBILE SYSTEM INCLUDING FIRMWARE VERIFICATION FUNCTION AND FIRMWARE UPDATE METHOD THEREOF

(71) Applicant: SAMSUNG ELECTRONICS CO., LTD., Suwon-si (KR)

(72) Inventors: Hyuksang Choi, Seoul (KR); Yongjae Sung, Seoul (KR); Jun Ho Lee, Hwaseong-si (KR); Wonill Lee, Yongin-si (KR); Hyosun Hwang, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/269,994

(22) Filed: Feb. 7, 2019

(65) Prior Publication Data

US 2019/0191310 A1 Jun. 20, 2019

Related U.S. Application Data

(63) Continuation of application No. 14/644,864, filed on Mar. 11, 2015, now Pat. No. 10,206,114.

(30) Foreign Application Priority Data

Mar. 11, 2014 (KR) .......................... 10-2014-0028458

(51) Int. Cl.
*H04W 12/10* (2009.01)
*H04L 9/32* (2006.01)
(Continued)

(52) U.S. Cl.
CPC ............ *H04W 12/10* (2013.01); *G06F 8/654* (2018.02); *H04L 9/3236* (2013.01);
(Continued)

(58) Field of Classification Search
CPC .................................. G06F 8/65; H04L 9/3247
See application file for complete search history.

(56) References Cited

U.S. PATENT DOCUMENTS

| 7,069,452 B1 | 6/2006 | Hind et al. |
| 8,281,229 B2 | 10/2012 | Chew et al. |

(Continued)

FOREIGN PATENT DOCUMENTS

| KR | 10-2006-0067575 A | 6/2006 |
| KR | 10-2008-0100674 A | 11/2008 |
| KR | 10-2014-0029070 A | 3/2014 |

*Primary Examiner* — Farid Homayounmehr
*Assistant Examiner* — Suman Debnath
(74) *Attorney, Agent, or Firm* — Sughrue Mion, PLLC

(57) ABSTRACT

Provided are a method of updating firmware of a device, a device, and a mobile system including the device. The method includes: receiving, from a host, a first hash value and a signature, the first hash value corresponding to a firmware image at the host; performing a pre-verify operation for at least one of integrity verification and signature certification on the firmware image using the received first hash value and the received signature; receiving the firmware image from the host according to a result of the pre-verify operation; and obtaining a second hash value from the received firmware image to perform a post-verify operation for at least one of integrity verification and signature certification on the received firmware image.

16 Claims, 11 Drawing Sheets

(51) Int. Cl.
　　　*G06F 8/654*　　　(2018.01)
　　　*H04W 12/00*　　　(2009.01)
　　　*H04L 29/06*　　　(2006.01)

(52) U.S. Cl.
　　　CPC ............ *H04L 9/3247* (2013.01); *H04L 63/12* (2013.01); *H04W 12/0023* (2019.01); *H04L 2209/80* (2013.01)

(56) References Cited

U.S. PATENT DOCUMENTS

| | | |
|---|---|---|
| 8,607,216 B2 | 12/2013 | Ibrahim et al. |
| 8,776,040 B2 | 7/2014 | Chalmers et al. |
| 2005/0004937 A1* | 1/2005 | Colarik ................. H04L 63/123 |
| 2008/0165952 A1 | 7/2008 | Smith |
| 2008/0289038 A1 | 11/2008 | Kim et al. |
| 2008/0320311 A1 | 12/2008 | Cho |
| 2010/0023777 A1* | 1/2010 | Prevost ................. G06F 21/572 |
| | | 713/180 |
| 2010/0169750 A1 | 7/2010 | Chew et al. |
| 2011/0131403 A1 | 6/2011 | Ibrahim et al. |
| 2011/0239211 A1 | 9/2011 | Kim et al. |
| 2011/0265075 A1 | 10/2011 | Lee |
| 2013/0047143 A1 | 2/2013 | Chalmers et al. |
| 2013/0047144 A1 | 2/2013 | Chalmers et al. |
| 2014/0156742 A1* | 6/2014 | Liu ......................... H04L 67/42 |
| | | 709/203 |
| 2015/0126108 A1 | 5/2015 | Ashley |

* cited by examiner

MOBILE SYSTEM INCLUDING FIRMWARE VERIFICATION FUNCTION AND FIRMWARE UPDATE METHOD THEREOF

CROSS-REFERENCE TO RELATED APPLICATION

This application is a continuation application of U.S. patent application Ser. No. 14/644,864, filed Mar. 11, 2015, which claims the benefits from Korean Patent Application No. 10-2014-0028458, filed on Mar. 11, 2014, in the Korean Intellectual Property Office, the disclosures of which are incorporated herein in their entirety by reference.

BACKGROUND

1. Technical Field

Apparatuses and methods consistent with exemplary embodiments relate to an electronic device, and more particularly, relate to a device capable of verifying firmware, a mobile system, and a firmware updating method.

2. Description of the Related Art

In recent years, there has been a rise in the development of mobile systems, such as smart phones, tablet personal computers (PCs), digital cameras, multimedia (e.g., MP3) players, personal digital assistants (PDAs), wearable smart devices, etc. As the amount of multimedia to be driven and the amount of data to be processed increase, mobile systems including high-speed processors have increased. A mobile system may drive (e.g., execute) a variety of application programs. For example, a mobile system may execute a variety of application programs for electronic payment, maps, camera, multimedia reproduction, Internet browsing, file sharing using a near field communication (NFC), etc. To drive a variety of application programs, the mobile system may incorporate semiconductor devices such as a working memory (e.g., dynamic random-access memory (DRAM)), a nonvolatile memory, and an application processor (hereinafter, referred to as "AP"). Also, the mobile system may include an NFC capability for electronic payment, a semiconductor device for Bluetooth, etc.

Some devices or components of the mobile system may be driven as hardware via firmware, regardless of an application program or an operating system (OS). Such firmware can be updated for stable performance and bug correction after shipping. However, hacking of devices of the mobile system has increased and hacking techniques have advanced. Thus, there is benefit to a high security level on firmware of devices of the mobile system.

Upon firmware update on devices of the mobile system, updating devices using erroneous firmware must be prevented. Also, an operation (e.g., rollback operation) that returns a firmware to a previous state when a firmware update operation fails should be included. Including such operations, however, may raise the unit cost of production of the mobile system. Accordingly, there is benefit to a mobile device including such operations that has a reduced unit cost of production.

SUMMARY

According to an aspect of another exemplary embodiment, there is provided a method of updating firmware of a device included in a mobile system, the method including: receiving, from a host, a first hash value and a signature, the first hash value corresponding to a firmware image at the host; performing a pre-verify operation for at least one of integrity verification and signature certification on the firmware image using the received first hash value and the received signature; receiving the firmware image from the host according to a result of the pre-verify operation; and obtaining a second hash value from the received firmware image to perform a post-verify operation for at least one of integrity verification and signature certification on the received firmware image.

The received first hash value may be a value obtained from the firmware image by performing a hash operation using a hash algorithm.

The performing the pre-verify operation may include: obtaining a third hash value from the received signature according to a signature algorithm; and comparing the received first hash value and the obtained third hash value.

The receiving the firmware image from the host may include requesting a transfer of the firmware image from the host in response to the received first hash value coinciding with the obtained third hash value according to the comparing.

The obtaining the second hash value may include: calculating the second hash value from the firmware image received from the host; and comparing the received first hash value and the calculated second hash value.

The method may further include setting an operation condition so as to drive the device with the firmware image in response to the received first hash value coinciding with the calculated second hash value according to the comparing.

The method may further include requesting a retransfer of the firmware image from the host in response to the received first hash value not coinciding with the calculated second hash value according to the comparing.

The received signature may be decoded using a public key while the pre-verify operation is performed.

According to an aspect of another exemplary embodiment, there is provided a method of updating firmware of a device included in a mobile system, the method including: obtaining a hash value from a firmware image via a hash operation; providing the obtained hash value and a signature to the device; receiving, from the device, a result of performing a pre-verify operation for at least one of integrity verification and signature certification on the firmware image using the provided hash value and the provided signature; and providing the firmware image to the device according to the received result of the pre-verify operation.

The providing the firmware image to the device may include providing the firmware image to the device in response to the received result of the pre-verify operation indicating that at least one of integrity of the firmware image and the provided signature is valid.

The method may further include requesting, from an update server, resending of at least one of the firmware image and the signature in response to the received result of the pre-verify operation indicating that at least one of integrity of the firmware image and the provided signature is invalid.

The method may further include receiving, from the device, a result of a post-verify operation for integrity verification on the provided firmware image.

The method may further include retransferring the firmware image to the device in response to the received result of the post-verify operation indicating that integrity of the provided firmware image is invalid.

According to an aspect of another exemplary embodiment, there is provided a mobile system including: a host adapted to obtain a first hash value from a firmware image; and a device adapted to perform a pre-verify operation on the firmware image based on the obtained first hash value received from the host and a signature received from the host, and to receive the firmware image from the host according to a result of the pre-verify operation.

The host may retransfer at least one of the first hash value and the signature to the device in response to the result of the pre-verify operation indicating that the firmware image is invalid.

The device may obtain a second hash value from the received firmware image and performs a post-verify operation in which the obtained second hash value is compared with the received first hash value.

The host may retransfer the firmware image to the device when a result of the post-verify operation indicates that the firmware image is invalid.

The device may include: a nonvolatile memory adapted to store the received firmware image or a previous version of the firmware image; and a central processing unit adapted to perform at least one of a hash operation and a signature operation for at least one of the pre-verify operation and the post-verify operation.

The nonvolatile memory may have a capacity sufficient to store only one of the received firmware image and the previous version of the firmware image at a same time.

The device may include a Near Field Communications (NFC) module.

The device may include: a nonvolatile memory adapted to store the received firmware image or a previous version of the firmware image; and a hardware intellectual property adapted to perform at least one of a hash operation and a signature operation for at least one of the pre-verify operation and the post-verify operation.

The nonvolatile memory may have a capacity sufficient to store only one of the received firmware image and the previous version of the firmware image at a same time.

According to an aspect of another exemplary embodiment, there is provided a device included in a mobile system, the device including: an interface adapted to receive, from a host of the mobile system, a first hash value and a signature, the first hash value corresponding to a firmware image at the host; and a controller adapted to control the interface to receive the firmware image from the host according to a result of a first verify operation for the firmware image using the received first hash value and the received signature.

The controller may be adapted to perform the first verify operation for the firmware image using the received first hash value and the received signature.

The controller may be adapted to obtain a second hash value from the received firmware image to perform a second verify operation on the received firmware image.

The first verify operation may be for at least one of integrity verification and signature certification of the firmware image at the host, and the second verify operation may be for at least one of integrity verification and signature certification on the received firmware image.

The controller may be adapted to perform the first verify operation for the firmware image using the received first hash value and the received signature, without receiving or using the firmware image.

The controller may be adapted to perform the first verify operation by obtaining a third hash value from the received signature according to a signature algorithm, and comparing the received first hash value and the obtained third hash value.

The controller may be adapted to control the interface to receive the firmware image from the host by requesting a transfer of the firmware image from the host in response to the received first hash value coinciding with the obtained third hash value according to the comparing.

The controller may be adapted to obtain the second hash value by calculating the second hash value from the firmware image received from the host, and comparing the received first hash value and the calculated second hash value.

The controller may be adapted to set an operation condition so as to drive the device with the firmware image in response to the received first hash value coinciding with the calculated second hash value according to the comparing.

The controller may be adapted to request a retransfer of the firmware image from the host in response to the received first hash value not coinciding with the calculated second hash value according to the comparing.

The device may further include a hardware intellectual property adapted to perform the first verify operation for the firmware image using the received first hash value and the received signature.

The hardware intellectual property may be adapted to obtain a second hash value from the received firmware image to perform a second verify operation on the received firmware image.

The controller may be adapted to decode the received signature using a public key while the first verify operation is performed.

The device may further include a nonvolatile memory adapted to store the received firmware image or a previous version of the firmware image.

The nonvolatile memory may have a capacity sufficient to store only one of the received firmware image and the previous version of the firmware image at a same time.

According to an aspect of another exemplary embodiment, there is provided a method of updating firmware of a device included in a mobile system, the method including: receiving, from a host, a first hash value and a signature, the first hash value corresponding to a firmware image at the host; performing a first verify operation on the firmware image using the received first hash value and the received signature; and receiving the firmware image from the host according to a result of the first verify operation.

The method may further include obtaining a second hash value from the received firmware image to perform a second verify operation on the received firmware image.

The first verify operation may be for at least one of integrity verification and signature certification of the firmware image at the host, and the second verify operation may be for at least one of integrity verification and signature certification on the received firmware image.

The performing the first verify operation may include performing the first verify operation for the firmware image using the received first hash value and the received signature, without receiving or using the firmware image.

The received first hash value may be a value obtained from the firmware image by performing a hash operation using a hash algorithm.

The performing the first verify operation may include: obtaining a third hash value from the received signature according to a signature algorithm; and comparing the received first hash value and the obtained third hash value.

The receiving the firmware image from the host may include requesting a transfer of the firmware image from the host in response to the received first hash value coinciding with the obtained third hash value according to the comparing.

The obtaining the second hash value may include: calculating the second hash value from the firmware image received from the host; and comparing the received first hash value and the calculated second hash value.

The method may further include setting an operation condition so as to drive the device with the firmware image in response to the received first hash value coinciding with the calculated second hash value according to the comparing.

The method may further include requesting a retransfer of the firmware image from the host in response to the received first hash value not coinciding with the calculated second hash value according to the comparing.

The received signature may be decoded using a public key while the first verify operation is performed.

BRIEF DESCRIPTION OF THE DRAWINGS

The above and other objects and features will become apparent from the following description with reference to the following figures, wherein like reference numerals refer to like parts throughout the various figures unless otherwise specified, and wherein.

DETAILED DESCRIPTION OF EXEMPLARY EMBODIMENTS

Figure 1:
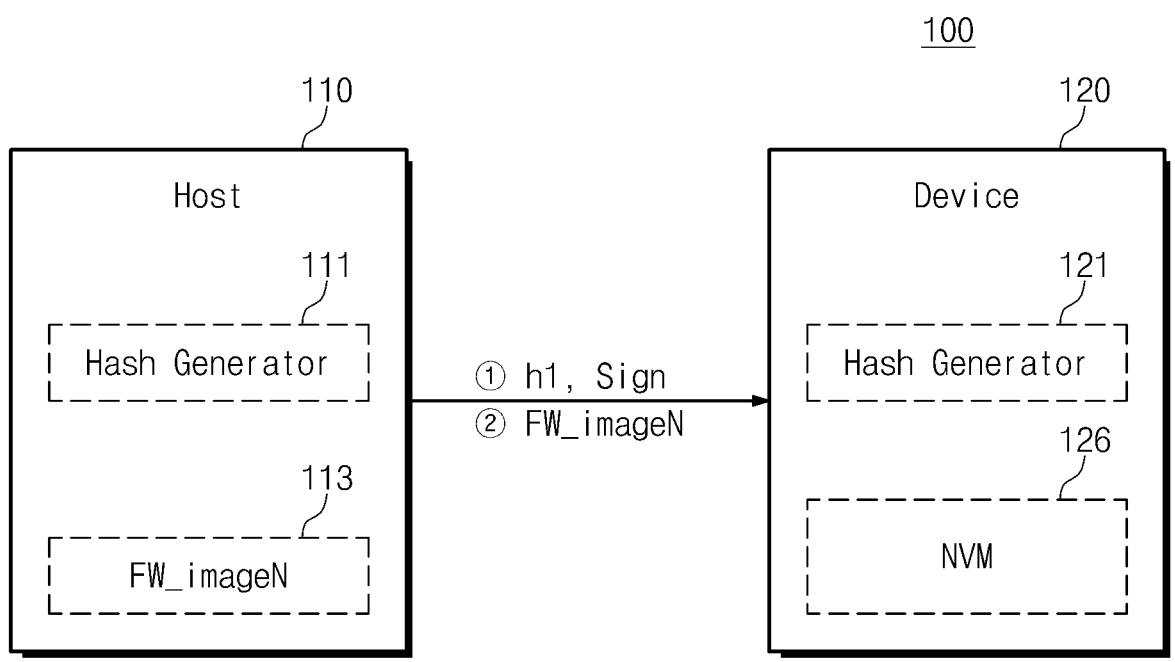
FIG. 1 is a block diagram schematically illustrating a mobile system according to an exemplary embodiment.

Exemplary embodiments will now be described in detail with reference to the accompanying drawings. An exemplary embodiment may, however, be embodied in various different forms, and should not be construed as being limited only to the illustrated exemplary embodiments. Rather, these exemplary embodiments are provided as examples so that this disclosure will be thorough and complete, and will fully convey the concept of the inventive concept to those skilled in the art. Accordingly, known processes, elements, and techniques are not described with respect to some exemplary embodiments. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Furthermore, expressions such as "at least one of," when preceding a list of elements, modify the entire list of elements and do not modify the individual elements of the list. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a mobile system 100 according to an exemplary embodiment. Referring to FIG. 1, a mobile system 100 includes a host 110 and a device 120. Upon firmware update of the device 120, the mobile system 100 may perform dual verification of firmware according to effective division of roles of the host 110 and the device 120.

The host 110 stores a firmware image (FW_imageN) 113 provided from an external device. The host 110 may download the firmware image 113 from an update server that provides firmware. The host 110 includes a hash generator 111 that generates (e.g., obtains) a hash value of the firmware image 113. The hash generator 111 may be implemented with an intellectual property (hereinafter, referred to as "IP") for driving a separate hash function. Alternatively, the hash generator 111 may be implemented by a software module that is driven according to a hash algorithm.

Here, the host 110 may be an application processor (hereinafter, referred to as "AP") of the mobile system 100. Alternatively, the host 110 may be a hardware IP or device for managing firmware of all devices of the mobile system 100. However, it is well understood that a configuration or range of the host 110 is not limited to the above-described exemplary embodiments.

At a firmware update operation of the device 120, the host 110 first produces a hash value h1 of the firmware image 113. The host 110 stores a signature Sign of the hash value h1 of the firmware image 113. A key management system or a hardware security module (HSM) may generate the signature Sign using a private key that a chip vendor or maker of the device 120 provides, although it is understood that one or more other exemplary embodiments are not limited thereto. The signature Sign may be provided to the host 110 via a wire-wireless network.

The host 110 exports the hash key h1 and the signature Sign, which are generated by the hash generator 111, to the device 120 for a pre-verify operation. The host 110 receives a result of the pre-verify operation for integrity and signature certification of the firmware image FW_imageN from a device. If receiving a result of the pre-verify operation indicating that the firmware image FW_imageN is valid, the host 110 sends the firmware image FW_imageN to the device 120.

The device 120 performs a verification operation for at least one of integrity verification and signature certification of the firmware image FW_imageN. The device 120 according to an exemplary embodiment performs a pre-verify operation that is executed based on a hash value h1 and a signature Sign of a firmware image (and not directly the firmware image itself) and a post-verify operation that is executed after an input firmware image is stored in a nonvolatile memory 126. Based on the pre-verify operation, the device 120 may perform at least one of integrity verification and signature certification of a new firmware image FW_imageN residing on the host 110, before a firmware image FW_imageO of a previous version stored in the nonvolatile memory 126 is updated. Based on the post-verify operation, the device 120 may perform at least one of integrity verification and signature certification of a firmware image FW_imageN stored in the nonvolatile memory 126.

The device 120 may export (e.g., transmits, outputs, or provides) a verify fail message to the host 110 when a result of the pre-verify operation represents that the firmware image FW_imageN is defective or the signature certification fails. In this case, the host 110 may discard the firmware image (FW_imageN) 113 or may request a new firmware image from an update server. According to another exemplary embodiment, the device 120 may not provide a message to the host 110 when the result of the pre-verify operation represents that the firmware image FW_imageN is defective or the signature certification fails. In this case, the host 110 may determine that the firmware image FW_imageN is defective or the signature certification fails if the host 110 does not receive a message from the device 120 after a predetermined period of time.

Meanwhile, the device 120 may export a verify pass message, representing that the firmware image FW_imageN is valid, to the host 110 when a result of the pre-verify operation represents that the firmware image FW_imageN is not defective and the signature certification does not fail. In response to receiving the verify pass message, the host 110 transfers the firmware image FW_imageN to the device 120. According to another exemplary embodiment, the device 120 may not provide a message to the host 110 when the result of the pre-verify operation represents that the firmware image FW_imageN is not defective and the signature certification does not fail. In this case, the host 110 may determine that the firmware image FW_imageN is not defective and the signature certification does not fail if the host 110 does not receive a message from the device 120 after a predetermined period of time. The device 120 stores the firmware image FW_imageN received from the host 110 in the nonvolatile memory 126.

After the firmware image FW_imageN is stored in the nonvolatile memory 126, the device 120 performs the post-verify operation on the firmware image FW_imageN stored in the nonvolatile memory 126. For the post-verify operation, the device 120 generates a hash value h1' of the firmware image FW_imageN in the nonvolatile memory 126 using a hash generator 121. The device 120 detects validity of the hash value h1' based on the signature Sign previously provided for the pre-verify operation. The post-verify operation may be performed for integrity verification and signature certification on the firmware image FW_imageN stored in the nonvolatile memory 126. Through the post-verify operation, the device 120 detects whether an error occurs while the firmware image FW_imageN is sent to the device 120 or while it is stored in the nonvolatile memory 126. Thus, the device 120 requests resending to the host 110 in response to determining, via the post-verify operation, that the firmware image FW_imageN is problematic.

As described above, the mobile system 100 according to the present exemplary embodiment is capable of performing dual integrity verification on the firmware image FW_imageN. Since a first integrity verification (i.e., pre-verify) on the firmware image FW_imageN is performed prior to storing the firmware image FW_imageN in the nonvolatile memory 126, restoring to a previous firmware image FW_imageO is easy when the firmware image FW_imageN is problematic. In addition, there is no need to increase a capacity of the nonvolatile memory 126 for update because an operation such as a rollback to a previous firmware image FW_imageO is unnecessary. Thus, it is possible to markedly reduce a capacity of the nonvolatile memory 126 that the device 120 includes. Also, the mobile system 100 according to an exemplary embodiment performs both integrity verification and signature certification of firmware to be updated, thereby providing a high firewall level against security attack using firmware.

Figure 2:
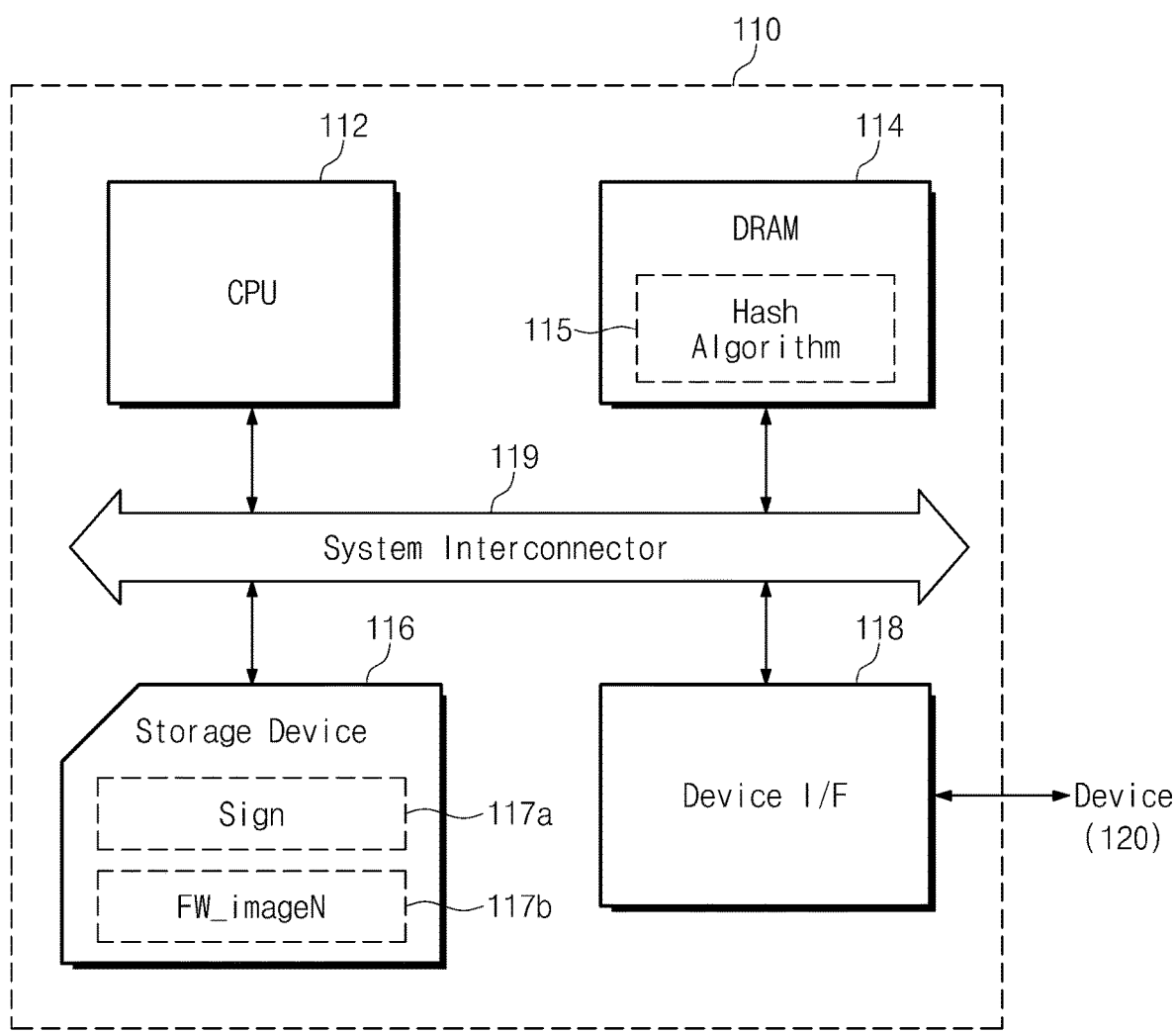
FIG. 2 is a block diagram schematically illustrating a host according to an exemplary embodiment.

FIG. 2 is a block diagram schematically illustrating a host 110 according to an exemplary embodiment. Referring to FIG. 2, a host 110 includes a controller (e.g., central processing unit (CPU) 112), a memory (e.g., a DRAM 114 in the present exemplary embodiment, although it is understood that one or more other exemplary embodiments are not limited thereto), a storage device 116, and a device interface 118. These components 112 to 118 are electrically interconnected via a system interconnector 119.

The CPU 112 executes software of the host 110, including an application program, an operating system, and device drivers. The CPU 112 executes an operating system OS that is loaded on the DRAM 114. The CPU 112 executes OS-based application programs. The CPU 112 executes a hash algorithm 115 loaded on the DRAM 114. At a firmware update operation, the CPU 112 executes the hash algorithm 115 to generate a hash value (or, a hash code) of a firmware image 117b. The CPU 112 may be implemented with a homogeneous multi-core processor or a heterogeneous multi-core processor.

The DRAM 114 may be a working memory of the CPU 112. The hash algorithm 115 is loaded on the DRAM 114. In addition, an operating system OS or basic application programs may be loaded on the DRAM 114 at booting. For example, upon booting of a mobile system 100, an OS image stored in the storage device 116 is loaded on the DRAM 114 according to a booting sequence. The operating system OS may support overall input/output operations of the mobile system 100. Similarly, application programs that are selected by a user or provide a basic service may be loaded on the DRAM 114. Furthermore, the firmware image 117b downloaded or received by the storage device 116 may be loaded on the DRAM 114 for a transfer to a device 120.

The storage device 116 may be provided as a nonvolatile storage medium of the mobile system 100. A signature 117a may be stored in the storage device 116. The storage device 116 is used to store the firmware image (FW_imageN) 117b of the device 1200 to be updated. In particular, the storage device 116 may be used to store a new firmware image (FW_imageN) 117b that is to replace or update a firmware image FW_imageO of a previous version. The signature 117a and the new firmware image 117b may be files that are downloaded from an update server by the host 110, or may be received via a wired or wireless communication from an external device (e.g., a memory device such as a flash memory, a desktop computer, etc.). The storage device 116 may store application programs, an operating system image, and various types of user data. The storage device 116 may be a memory card (e.g., MultiMediaCard (MMC), embedded MMC (eMMC), secure digital (SD), micro DD (MicroSD), etc.). The storage device 116 may include a NAND flash memory with a mass storage capacity. Alternatively, the storage device 116 may include a next-generation nonvolatile memory, such as phase-change memory (PRAM), magnetoresistive random-access memory (MRAM), resistive random-access memory (ReRAM), ferroelectric random-access memory (FRAM), etc., or a NOR flash memory.

The device interface 118 accesses the device 120 according to a request or control of the CPU 112. That is, the device interface 118 interfaces the host 110 with the device 120. For example, data that the CPU 112 processes is stored in or provided to the device 120 via the device interface 118. Furthermore, data that the device 120 processes may be provided to the CPU 112 via the device interface 118.

The system interconnector 119 is a system bus for providing an on-chip network in the host 110. The system interconnect 119, for example, may include a data bus, an address bus, and a control bus. The data bus may be a path where data migrates. In particular, the data bus may provide a memory access path into the DRAM 114 or the storage device 116. The address bus may provide an address exchange path among intellectual properties IPs. The control bus may provide a path for transferring control signals among intellectual properties IPs. However, it is understood that a configuration of the system interconnector 119 is not limited to the present exemplary embodiment. For example, the system interconnector 119 may further include arbitration means for efficient management.

As described above, the host 110 according to an exemplary embodiment includes a hash value generation operation using, for example, a hash algorithm 115 for updating firmware of the device 120. At a firmware update operation, the host 110 performs a hash operation on the firmware image 117b and sends a resultant value, i.e., a hash value h1, to the device together with a signature Sign. The host 110 may be provided, from the device 120, with a result of a pre-verify operation that is executed using the hash value h1 and the signature Sign. The host 110 transfers the firmware image 117b to the device 120 according to a result of the pre-verify operation.

Figure 3:
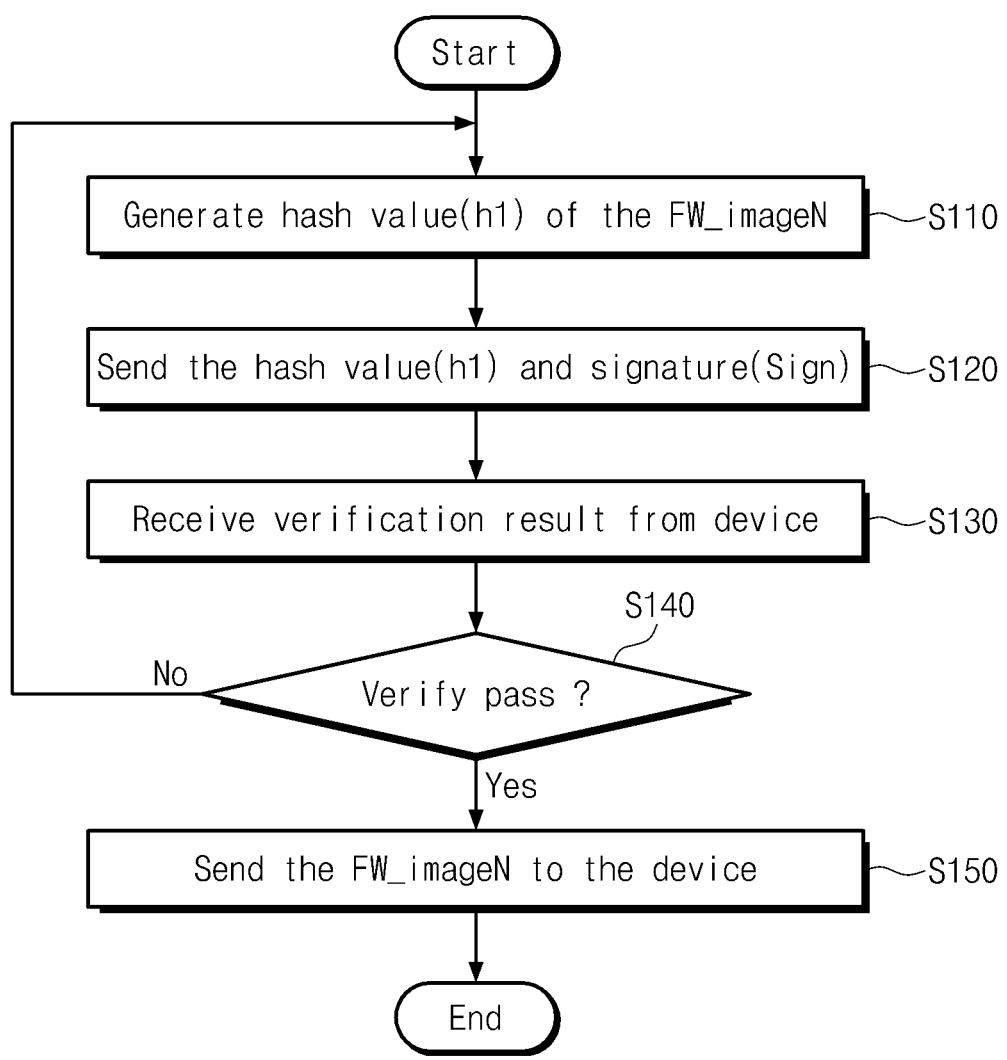
FIG. 3 is a flowchart schematically illustrating a firmware update method executed on a host according to an exemplary embodiment.

FIG. 3 is a flowchart schematically illustrating a firmware update method executed on a host 110, according to an exemplary embodiment. Referring to FIGS. 2 and 3, a host 110 transmits a hash value h1 and a signature Sign for a pre-verify operation that is to be executed or performed on a device 120. The host 110 may determine whether to send a firmware image FW_imageN, based on a result of the pre-verify operation. Here, it is assumed that firmware version information is checked and a signature Sign and a new firmware image FW_imageN are downloaded from an update server, although it is understood that one or more other exemplary embodiments are not limited thereto.

In operation S110, the host 110 generates a hash value h1 of a new firmware image FW_imageN using a hash algorithm 115. The host 110 generates the hash value h1 from the new firmware image FW_imageN using the hash algorithm 115. The size of the hash value h1 that the hash algorithm 115 generates may be much smaller as compared to the new firmware image FW_imageN.

In operation S120, the host 110 provides the device 120 with the hash value h1 and the signature Sign generated from the firmware image FW_imageN. A transfer of the new firmware image FW_imageN may be performed according to a result of a pre-verify operation, which uses the signature Sign and the hash value h1, from the device 120.

In operation S130, the host 110 receives a verification result of the new firmware image FW_imageN from the device 120. The device 120 may perform integrity verification and signature certification of the new firmware image FW_imageN using the signature Sign and the hash value h1 (i.e., without directly using the new firmware image FW_imageN). The integrity verification and signature certification may make it possible to check security and whether an error exists at the new firmware image FW_imageN. The device 120 provides the host 110 with a result of the pre-verify operation that uses the signature Sign and the hash value h1. In operation S140, the host 110 confirms whether a result of the pre-verify operation provided from the device 120 indicates verification pass or verification fail (valid or invalid). If the result of the pre-verify operation indicates verification pass, the method proceeds to operation S150. If the result of the pre-verify operation indicates verification fail, the method proceeds to operation S110.

In operation S150, the host 110 provides the device 120 with the new firmware image FW_imageN of which integrity and signature certification are successfully verified based on the hash value h1 and the signature Sign. In addition, the host 110 may resend the new firmware image FW_imageN to the device 120 when a result of a post-verify operation performed in the device 120 indicates that an error exists at the new firmware image FW_imageN.

With the firmware update operation, the host 110 provides the device 120 with a hash value h1 and a signature Sign of a downloaded firmware image FW_imageN. Then, the device 120 performs integrity verification and signature certification of the firmware image FW_imageN using the hash value h1 and the signature Sign (i.e., without directly using the new firmware image FW_imageN). This may be referred to as a pre-verify operation of a firmware image that is performed in the device 120. The host 110 is provided with a result of the pre-verify operation from the device 120 and transmits a firmware image FW_imageN to the device 120 based on the result of the pre-verify operation.

Figure 4:
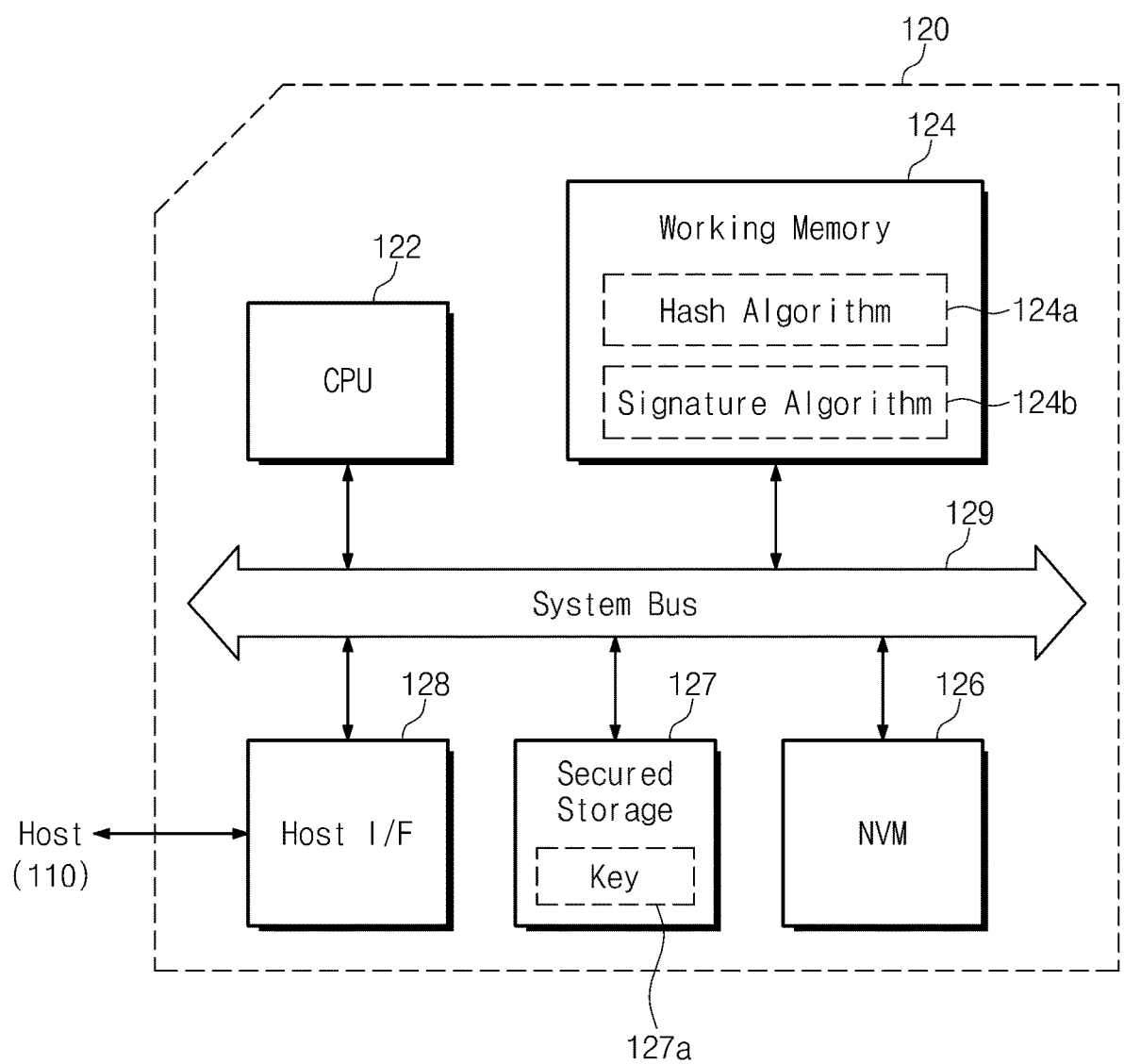
FIG. 4 is a block diagram schematically illustrating a device according to an exemplary embodiment.

FIG. 4 is a block diagram schematically illustrating a device 120 according to an exemplary embodiment. Referring to FIG. 4, a device 120 includes a controller (e.g., CPU 122), a working memory 124, a nonvolatile memory 126, secured storage 127, and a host interface 128. Furthermore, the device 120 performs a pre-verify operation and a post-verify operation on a firmware image.

The CPU 122 executes a hash algorithm 124a and a signature algorithm 124b that are loaded or stored on the working memory 124. The CPU 122 performs the pre-verify operation based on a hash value h1 and a signature Sign that a host 110 provides. The pre-verify operation may be performed by the signature algorithm 124b. In addition, the CPU 122 performs a post-verify operation on a new firmware image FW_imageN that the host 110 provides. That is, if a result of the pre-verify operation indicates that integrity verification and signature certification are verify-passed, the new firmware image FW_imageN is transferred (e.g., copied, moved, etc.) from the host 110 to the device 120. The device 120 stores the new firmware image FW_imageN in the nonvolatile memory 126.

The CPU 122 performs a post-verify operation on the new firmware image FW_imageN after the new firmware image FW_imageN is stored in the nonvolatile memory 126. The hash algorithm 124a is again used for the post-verify operation. That is, the CPU 122 calculates (e.g., obtains) a hash value h1' on the new firmware image FW_imageN for the post-verify operation. The CPU 122 compares the hash value h1' with the hash value h1 provided for the pre-verify operation. The post-verify operation may be determined as being passed, if the hash value h1 provided from the host 110 is identical to the hash value h1' generated by the hash algorithm 124a. That is, integrity and signature validity on the new firmware image FW_imageN may be ensured.

The working memory 124 may be used to load algorithms for verification operations that the device 120 performs for firmware update. On the working memory 124 are loaded the signature algorithm 124b used for the pre-verify operation and the post-verify operation and the hash algorithm 124a used for the post-verify operation. Also, the working memory 124 may store a public key Y used for the pre-verify operation and the post-verify operation. The working memory 124 may be, for example, a code memory such as DRAM or static random-access memory (SRAM). However, it is well understood that the hash algorithm 124a or the signature algorithm 124b are executable on a ROM or a nonvolatile memory that supports eXecution In Place (XIP) according to one or more other exemplary embodiments.

The nonvolatile memory 126 stores a firmware image. In particular, the nonvolatile memory 126 may be used as a firmware memory of the device 120. Firmware may be stored and updated in the nonvolatile memory 126. Firmware update may be completed by programming (e.g., storing) firmware in the nonvolatile memory 126 and setting the programmed firmware such that the device 120 is driven. In case of using a firmware update method of an exemplary embodiment, the nonvolatile memory 126 may not perform a rollback on a firmware image of a previous version. Thus, it is possible to set a capacity of the nonvolatile memory 126 lower, so as to contain a new firmware image FW_imageN.

The firmware update method according to an exemplary embodiment may make it possible to markedly reduce a capacity of the nonvolatile memory 126 of the device 120. A decrease in the size of the nonvolatile memory 126 may result in reducing a cost of production of the device 120 that provides a mobile system 100 with a specific operation.

The secured storage 127 may is a memory that stores a public key 127a. Since the public key 127a is used when the signature algorithm 124b is executed, an access of an external device to the public key 127a may be blocked. Thus, the public key 127a may be stored in the secured storage 127 that does not allow a free access of an external device.

The host interface 128 may provide the device 120 with a channel for exchanging data with the host 110. A system bus 129 provides a communication channel among (i.e., between) components of the device 120.

In FIG. 4, there is illustrated an example of a device 120 that executes the hash algorithm 124a and the signature algorithm 124b based on the CPU 122. The device 120 according to an exemplary embodiment may perform integrity verification and signature certification of a firmware image by performing a dual verification operation. In addition, the dual verification operation may make it possible to markedly reduce a capacity of a nonvolatile memory 126 for firmware update.

Figure 5:
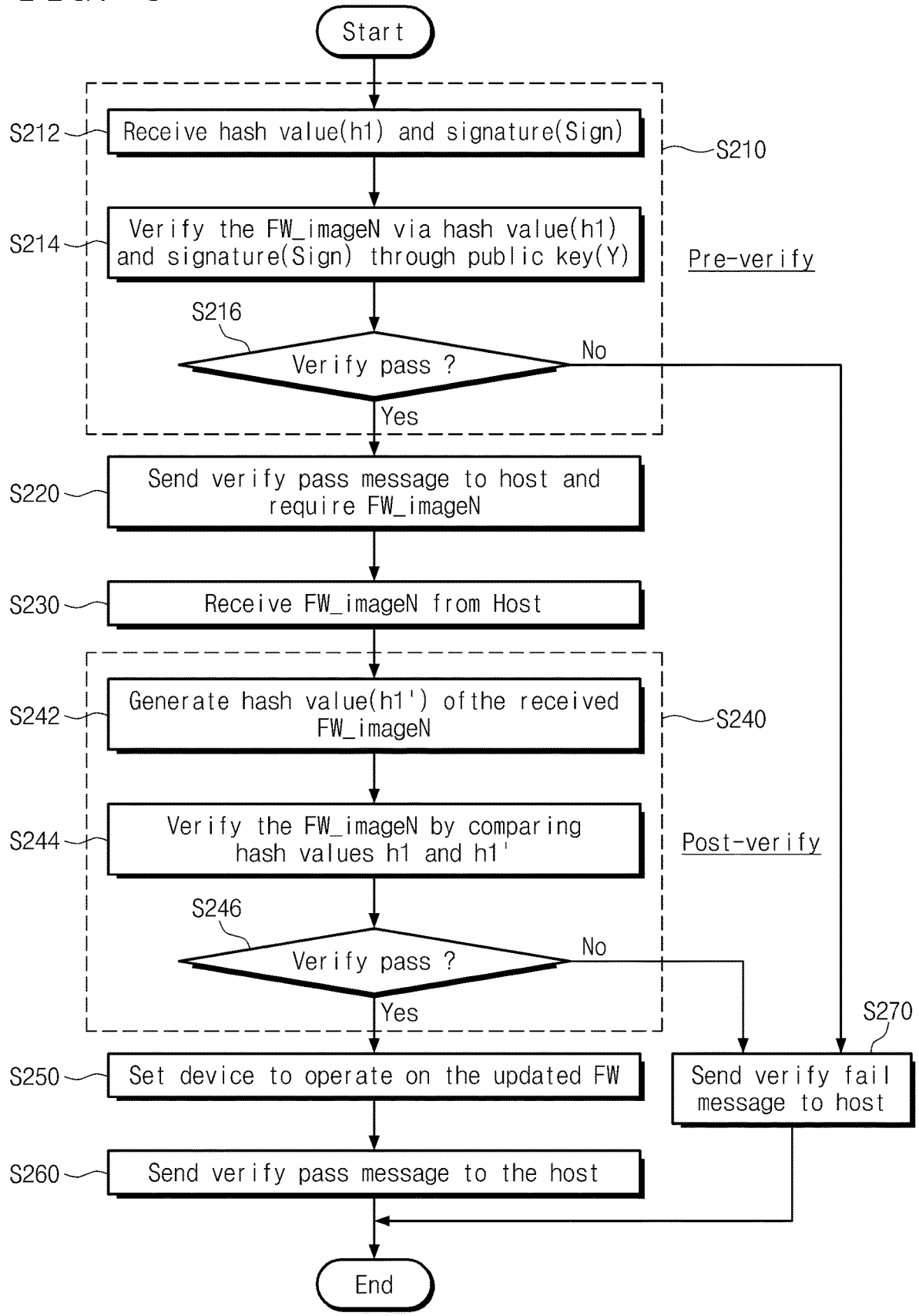
FIG. 5 is a flowchart schematically illustrating a firmware update method executed on a device according to an exemplary embodiment.

FIG. 5 is a flowchart schematically illustrating a firmware update method executed on a device 120 according to an exemplary embodiment. A firmware integrity verification operation and a signature certification operation included in a pre-verify operation and post-verify operation executed on a device 120 will now be described with reference to FIG. 5. In response to receiving a hash value h1 and a signature Sign on a new firmware image FW_imageN from a host 110, the device 120 may start or perform a pre-verify operation.

Operation S210 represents the pre-verify operation and includes operations of receiving a hash value h1 and a signature Sign (S212), performing integrity verification and signature certification using a public key (S214), and checking whether verification has passed (S216).

In detail, in operation S212, the device 120 receives the hash value h1 and the signature Sign from the host 110. The hash value h1 and the signature Sign may be stored in a working memory 124 of the device 120.

In operation S214, the device 120 performs a pre-verify operation using the hash value h1 and the signature Sign. A verification operation on the signature Sign is performed for the pre-verify operation. The signature Sign may be decoded using a public key for signature certification that is included in the device 120. That is, the signature Sign may be output as a hash value h1' through a signature algorithm using the public key. Verification is performed by comparing the hash value h1 from the host 110 with the hash value h1' obtained from the signature Sign via the signature algorithm.

If the hash value h1 is identical to the hash value h1' decoded from the signature using the public key, in operation S216, the verification is determined as being passed. That is, integrity and signature of a new firmware image FW_imageN provided from the host 110 are determined to be valid. In this case, the method proceeds to operation S220. If the hash value h1 is not identical to the hash value h1' decoded from the signature using the public key, in operation S216, the verification is determined as failing. That is, integrity and signature of a new firmware image FW_imageN provided from the host 110 are determined to be invalid. In this case, the method proceeds to operation S270.

In operation S220, the device 120 sends a verification-pass message to the host 110. According to another exemplary embodiment, the device 120 requests a transfer a new firmware image FW_imageN at the host 110. In either case, the host 110 loads a new firmware image FW_imageN stored in a storage device 116 to a memory (e.g., DRAM 114) and transfers the new firmware image FW_imageN to the device 120. Since the new firmware image FW_imageN may have a relatively large data size, the new firmware image FW_imageN may be transmitted to the device 120 according to a plurality of transactions.

In operation S230, the device 120 stores the new firmware image FW_imageN from the host 110 in a nonvolatile memory 126. Since the nonvolatile memory 126 includes a firmware image FW_imageO of a previous version, the device 120 may erase the nonvolatile memory 126 to discard the firmware image FW_imageO of a previous version. The device 120 may program (e.g., store) the new firmware image FW_imageN at the nonvolatile memory 126. That is, that the device 120 is provided with the new firmware image FW_imageN may result in the firmware image FW_imageO of a previous version being discarded.

In operation S240, the device 120 performs a post-verify operation. The post-verify operation may include operations of generating a hash value h1' on the new firmware image FW_imageN stored in the nonvolatile memory 126 (S242), performing integrity verification and signature certification on the new firmware image FW_imageN based on the hash value h1' (S244), and checking whether verification is passed (S246).

In detail, in operation S242, a CPU 122 of the device 120 processes the new firmware image FW_imageN stored in the nonvolatile memory 126 according to a hash algorithm 124a. The hash algorithm 124a outputs the new firmware image FW_imageN corresponding to a message bit stream as a hash value h1'. A public key may not be used when the hash algorithm 124a is executed.

In operation S244, the new firmware image FW_imageN stored in the nonvolatile memory 126 is verified. Verification is made by comparing the hash value h1' generated by the hash algorithm 124a with the hash value h1 from the host 110. In operation S246, whether verification passes is determined based on whether the hash value h1 is identical to the hash value h1'. If the hash value h1 is identical to the hash value h1', the verification is determined to be passed. Accordingly, in this case, the method proceeds to operation S250. If the hash value h1 is not identical to the hash value h1', the verification is determined to be failed. Accordingly, in this case, the method proceeds to operation S270.

Since integrity verification on the new firmware image FW_imageN is detected as being valid, in operation S250, the device 120 is set to operate using firmware stored in the nonvolatile memory 126.

In operation S260, the device 120 transfers, to the host 110, a verification-pass message informing that integrity on the new firmware image FW_imageN that the host 110 provides is valid. The host 110 checks the verification-pass message and terminates a firmware update operation that the host 110 performs. According to another exemplary embodiment, the device 120 may not provide a message to the host 110 when the result of the post-verify operation represents that the integrity of the firmware image FW_imageN is valid. In this case, the host 110 may determine that the integrity of the new firmware image FW_imageN is not defective if the host 110 does not receive a message from the device 120 after a predetermined period of time. Furthermore, upon receiving the verification-pass message or otherwise determining that verification has passed, the host 110 may discard the firmware image FW_imageN stored therein.

In operation S270, the device 120 sends a verification-fail message to the host 110. In response to an input of the verification-fail message on the pre-verify operation, the host 110 sends new hash value h1 and signature Sign to the device 120. In response to an input of the verification-fail message on the post-verify operation, the host 110 sends a firmware image FW_imageN to the device 120.

As described above, the device 120 performs a pre-verify operation (corresponding to operation S210) for integrity verification and signature certification based on a hash value h1 and a signature Sign on a new firmware image FW_imageN from the host 110. In addition, the device 120 performs a post-verify operation (corresponding to operation S240) for integrity verification based on a new firmware image FW_imageN from the host 110. If receiving a verification-fail message at the pre-verify operation, the host 110 may download a new firmware image from an update server and re-starts a firmware update operation. If receiving a verification-fail message at the post-verify operation, the host 110 resends a new firmware image FW_imageN, maintained in the host 110, to the device 120. The dual integrity and signature certification operation may make it possible to reduce a need for a memory space for a rollback of a firmware image at a firmware update operation. Thus, it is possible to markedly reduce the size of the nonvolatile memory 126 that is embedded in the device 120.

Figure 6:
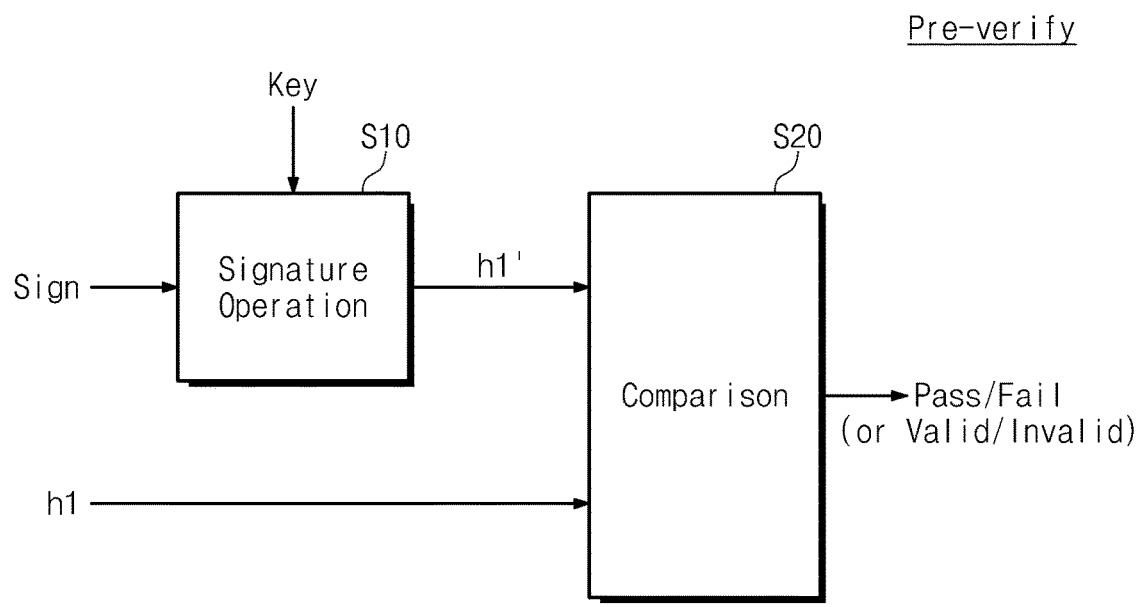
FIGS. 6 and 7 are block diagrams for describing a pre-verify operation and a post-verify operation according to one or more exemplary embodiments.
Figure 7:
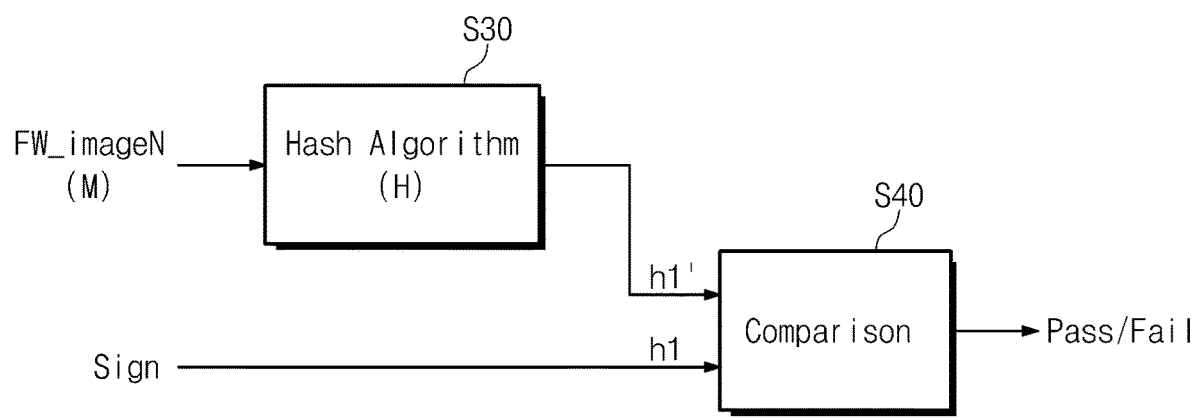

FIGS. 6 and 7 are block diagrams for describing a pre-verify operation and a post-verify operation according to one or more exemplary embodiments. Referring to FIG. 6, a device 120 performs a pre-verify operation on a hash value h1 and a signature Sign that a host 110 transmits.

At the pre-verify operation, signature certification is first performed using a signature algorithm. This operation corresponds to operation S10. If receiving a signature Sign, a CPU 122 of the device 120 performs a signature operation using a public key. That is, the signature Sign is decoded. The public key for decoding the signature Sign may be a value that is contained and retained in a specific area of a working memory 124 or a nonvolatile memory 126 of the device 120. A hash value h1' is generated by decoding the signature Sign using the signature algorithm.

After the hash value h1' is generated, operation S20 is carried out to compare hash values h1 and h1'. The hash value h1 may be a hash code, which a hash algorithm of the host 110 generates. The hash value h1' may be a hash code, which is generated by decoding the signature Sign from the host 110 on the device 120. In case the hash value h1 is identical to the hash value h1', the pre-verify operation is determined as being valid or verify-passed. If the hash value h1 is not identical to the hash value h1', the pre-verify operation is determined as being invalid or verify-failed.

Referring to FIG. 7, there is illustrated a post-verify operation that the device 120 performs. The post-verify operation includes operations of generating a hash value h1' of a new firmware image FW_imageN stored in the device 120 according to the hash algorithm (S30) and comparing hash values h1 and h1' (S40).

In operation S30 of generating a hash value h1', a CPU 122 of the device 120 produces a hash value h1' based on a new firmware image FW_imageN stored in the nonvolatile memory 126. A public key is not used while the hash algorithm is executed.

In operation S40, there is determined whether the hash value h1 corresponds to the hash value h1'. If the hash value h1 corresponds to the hash value h1', a result of the post verification operation is output as being verify-passed or valid. In case the hash value h1 does not correspond to the hash value h1', a result of the post verification operation is output as being verify-failed or invalid, which indicates that integrity of a new firmware image FW_imageN stored in the nonvolatile memory 126 is problematic.

The pre-verify operation and post-verify operation of the device 120 have been described above with reference to FIGS. 6 and 7. The pre-verify operation may be accomplished by a public key operation using a hash value h1 and a signature Sign without a transfer of a new firmware image FW_imageN. A new firmware image FW_imageN is transferred and stored in the nonvolatile memory 126 of the device 120 only when integrity verification and signature certification of the pre-verify operation are completed. In addition, a post-verify operation accompanying a hash operation is executed after the firmware image FW_imageN is stored in the nonvolatile memory 126 of the device 120. During the post-verify operation, a hash operation is executed or used on the firmware image FW_imageN. Integrity of a firmware image programmed on the device 120 is strengthened by dually performing integrity verification and signature certification of the firmware image. A security level of a firmware image is strengthened through the dual verification procedure. Since integrity verification and signature certification are performed through the pre-verify operation without a transfer of a new firmware image FW_imageN to the device 120, it is possible to reduce the burden and the capacity of the nonvolatile memory 126 that is used as a firmware memory.

Figure 8:
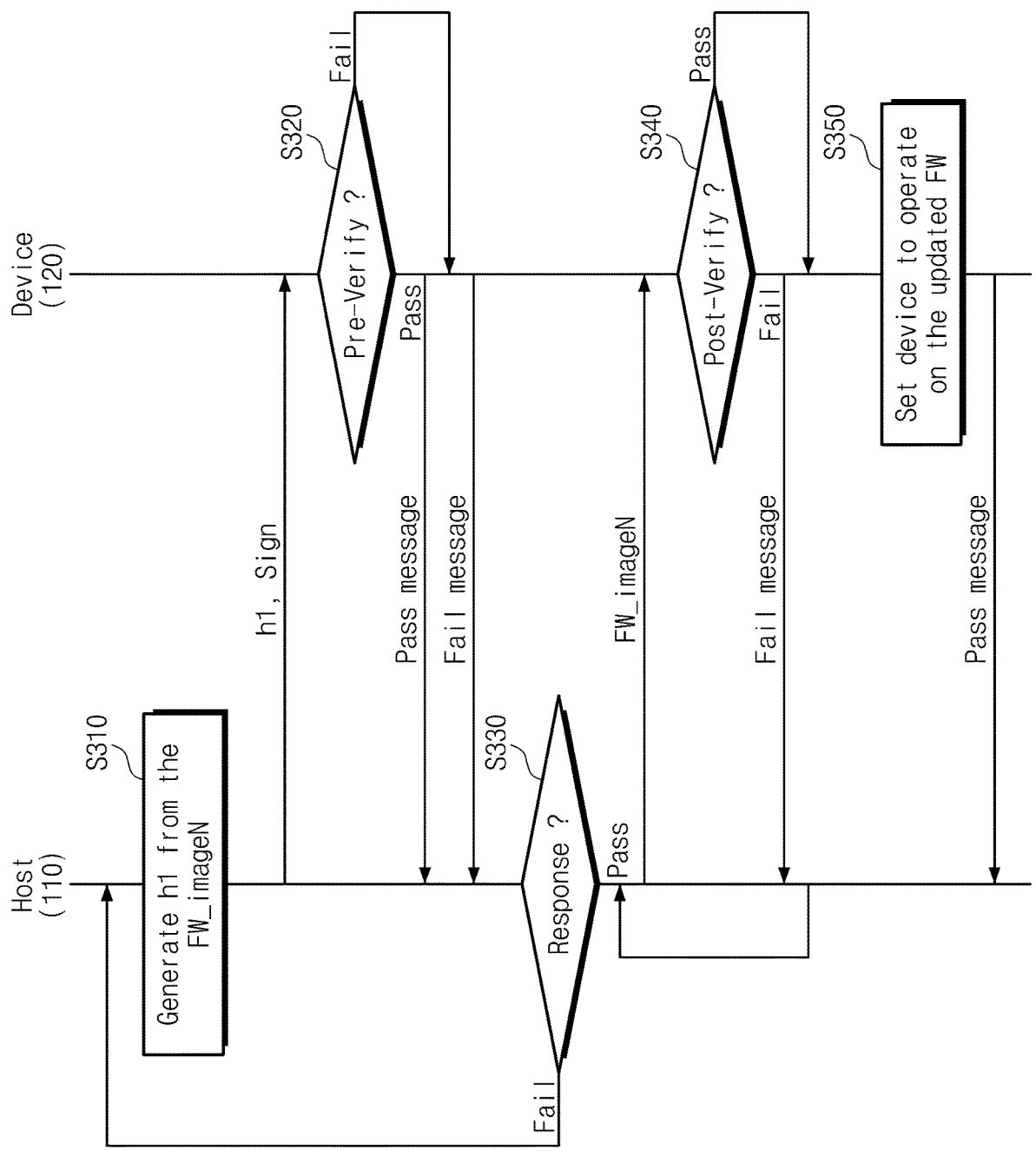
FIG. 8 is a diagram for describing a firmware update operation of a mobile system according to an exemplary embodiment that includes a host and a device.

FIG. 8 is a diagram for describing a firmware update operation of a mobile system that includes a host 110 and a device 120, according to an exemplary embodiment. Referring to FIG. 8, integrity verification and signature certification on firmware to be updated are divided between a host 110 and a device 120. A firmware update procedure of the inventive concept commences if the host 110 downloads a signature Sign and a firmware image FW_imageN from a firmware server.

In operation S310, the host 110 drives a hash algorithm to calculate a hash value h1 of a firmware image FW_imageN to be updated. The host 110 exports the hash value h1 and the signature Sign to the device 120 so that the device 120 may carry a pre-verify operation.

Operation S320 corresponds to a procedure for showing a result of the pre-verify operation of the device 120. The device 120 performs the pre-verify operation using the hash value h1 and the signature Sign, which are provided from the host 110. That is, the device 120 executes a certification operation using a public key on the signature Sign to generate a decoded hash value h1'. A result of the pre-verify operation is decided by comparing the decoded hash value h1' and the hash value h1. The device 120 sends a pass message to the host 110 when the decoded hash value h1' coincides with the hash value h1. In contrast, the device 120 sends a fail message to the host 110 when the decoded hash value h1' does not coincide with the hash value h1.

In operation S330, the host 110 determines whether either a pass message or a fail message is received from the device 120. The host 110 sends the hash value h1 and the signature Sign or a new firmware image FW_imageN to the device 120 based on a result of the pre-verify operation from the device 120. In case the host 110 receives the fail message from the device 120, the host 110 may iterate a procedure of generating the hash value h1 from the firmware image FW_imageN. Alternatively, the host 110 may request a firmware image and a signature Sign be re-sent from the update server and iterate a procedure of generating a hash value h1 from a firmware image FW_imageN that is re-sent. In response to receiving the pass message from the device 120, the host 110 transmits the firmware image FW_imageN to the device 120.

Upon receiving the firmware image FW_imageN from the host 110, the device 120 performs a post-verify operation, which corresponds to operation S340. The device 120 produces a hash value h1' of a new firmware image FW_imageN stored in a nonvolatile memory 126 (refer to FIG. 4). The device 120 comprises the hash value h1' with the hash value h1 received at the pre-verify operation. The device 120 may perform a follow-up operation based on a comparison result of the hash values h1 and h1'.

The device 120 sends a fail message to the host 110 when the hash value h1 does not coincide with the hash value h1'. A fail message provided to the host 110 indicates that an error occurs while a firmware image FW_imageN from the host 110 is programmed at the nonvolatile memory 126. In this case, the host 110 resends the firmware image FW_imageN to the device 120 in response to the fail message.

In case the hash value h1 coincides with the hash value h1', the device 120 is set to operate based on the firmware image FW_imageN stored in the nonvolatile memory 126 of the device 120, which corresponds to operation S350. Accordingly, the device 120 may send a pass message to the host 110.

The host 110 terminates the firmware update operation of the device 120 in response to the pass message on the post-verify operation.

As described above, a mutual update operation is performed between the host 110 and the device 120. Specifically, the host 110 runs or uses a hash algorithm to send a hash value h1 and a signature Sign on a new firmware image FW_imageN. For integrity verification and signature certification on the new firmware image FW_imageN, the device 120 performs a pre-verify operation referring to the hash value h1 and the signature Sign. The host 110 sends the new firmware image FW_imageN certified through the pre-verify operation to the device 120. The device 120 performs a post-verify operation on the firmware image FW_imageN transmitted from the host 110. A firmware image FW_imageN that is determined as being verify-failed via the post-verify operation may be discarded, and resending may be requested.

The pre-verify operation and the post-verify operation may make it possible to skip a rollback of a firmware image FW_imageO of a previous version when firmware of the device 120 is updated. In particular, integrity verification and signature certification of a new firmware image FW_imageN are performed, although a hash value h1 and a signature Sign are provided to the device 120 at a pre-verify operation. A separate capacity of a nonvolatile memory for a rollback is unnecessary, thereby reducing a cost of production of the device 120 markedly.

Figure 9:
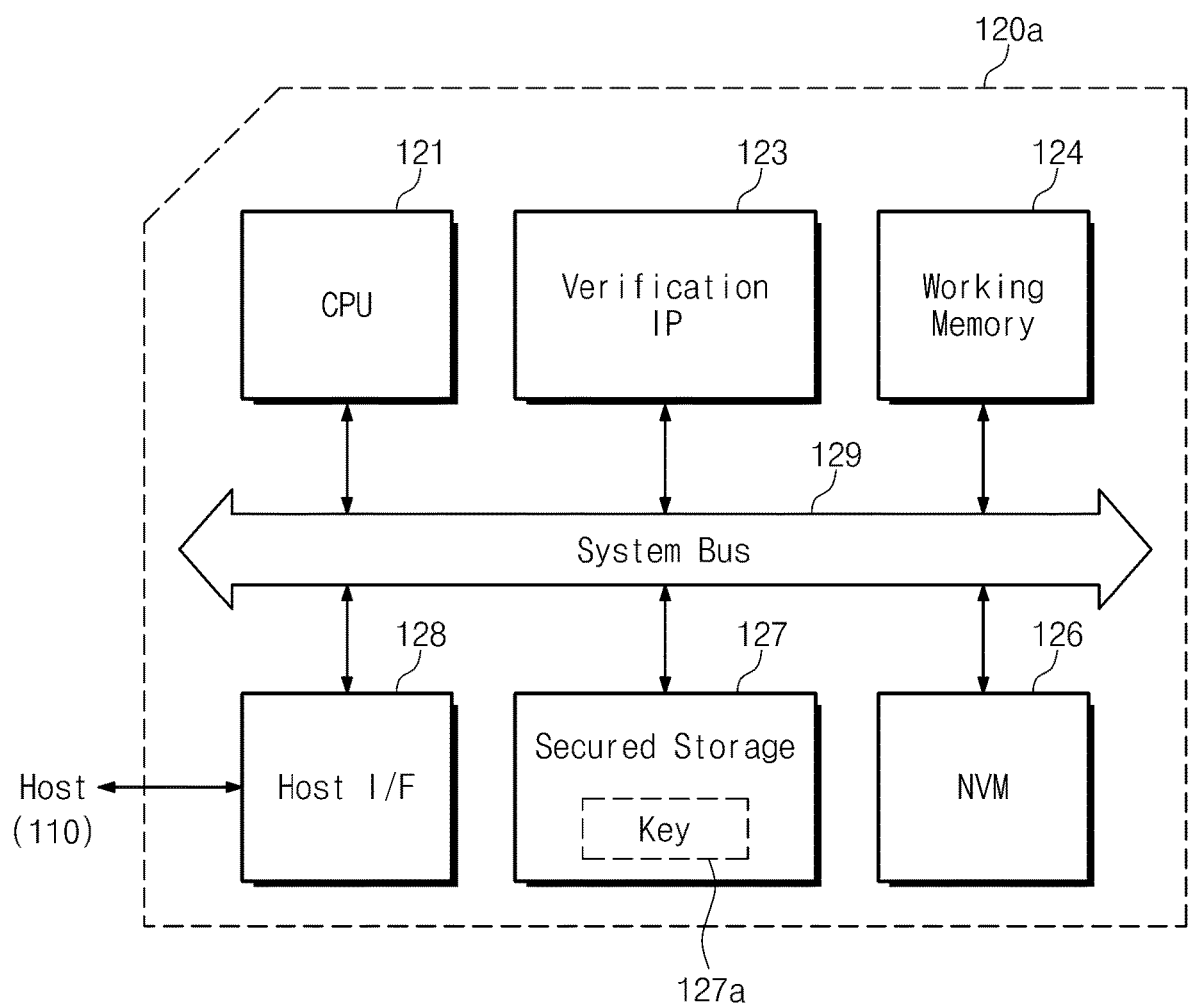
FIG. 9 is a block diagram schematically illustrating a device according to another exemplary embodiment.

FIG. 9 is a block diagram schematically illustrating a device 120a according to another exemplary embodiment. Referring to FIG. 9, a device 120a includes a verification IP 123 for signature certification or a hash operation. A device 120 shown in FIG. 4 may be implemented with a CPU-based semiconductor device. For efficiency of operation, the verification IP 123 may support a firmware update operation of the device 120a of the present exemplary embodiment. The device 120a includes a CPU 121, the verification IP 123, a working memory 124, a nonvolatile memory 126, secured storage 127, and a host interface 128. In FIG. 9, components that are identical or similar to those shown in FIG. 4 may be marked by the same reference numerals, and a description thereof is thus omitted below.

The CPU 121 runs (e.g., executes) various program codes loaded on the working memory 124. However, in the present exemplary embodiment, the CPU 121 does not execute a hash algorithm or a signature algorithm for a pre-verify operation or a post-verify operation. As discrete hardware, the verification IP 123 performs a hash value generation operation and a public key operation for decoding a signature, at a firmware update operation.

The verification IP 123 runs a hash algorithm and a signature algorithm at a firmware update operation. If a signature Sign and a hash value h1 are received from the host 110, the verification IP 123 performs a pre-verify operation according to a request of a CPU 121. The pre-verify operation includes an operation of generating a hash value h1' from the signature Sign using a public key. Integrity verification and signature certification of firmware may be performed by comparing the hash value h1' with the hash value h1 from the host 110. In addition, the verification IP 123 performs a post-verify operation. If a new firmware image FW_imageN transferred from the host 110 is stored in the nonvolatile memory 126, the verification IP 123 performs the post-verify operation on the new firmware image FW_imageN. For the post-verify operation, the verification IP 123 calculates (e.g., obtains) a hash value h1' on the new firmware image FW_imageN. The verification IP 123 compares the hash value h1' with a previously provided hash value h1' for verification. In case a hash value h1' generated as a result of a public key operation on the signature Sign is equal to the hash value h1, the post-verify operation is determined as being verify-passed, i.e., indicating that integrity of the new firmware image FW_imageN is ensured. The verification IP 123 may be formed of (e.g., include) an operation block for performing a hash operation and an operation block for performing a signature operation. Also, it is well understood that the verification IP 123 may be formed of a plurality of IPs.

The nonvolatile memory 126 may store a previous version of a firmware image FW_imageO or a new version of a firmware image FW_imageN. Firmware is stored and updated in the nonvolatile memory 126. A firmware update is completed by programming a firmware image at the nonvolatile memory 126 and changing a setting such that the device 120a operates based on the programmed firmware image. Although a new version of the firmware image FW_imageN is programmed at the nonvolatile memory 126, a setting may be changed such that the firmware image FW_imageN is activated after verified via the post-verify operation. That is, resending of a firmware image FW_imageN is requested when a result of the post-verify operation indicates that the new firmware image FW_imageN stored in the nonvolatile memory 126 is erroneous.

In case a firmware update method according to an exemplary embodiment is used, the nonvolatile memory 126 need not make a backup of a previous version of the firmware image FW_imageO for a rollback. Thus, a capacity of the nonvolatile memory 126 need only be sufficient to contain a new firmware image FW_imageN. Accordingly, it is possible to markedly reduce the size of the nonvolatile memory 126 to be embedded in the device 120a. In addition, the nonvolatile memory 126 may have an additional capacity for storing a public key and signature information. Such data, however, may not use a large amount of memory capacity. A decrease in a capacity of the nonvolatile memory 126 may result in a reduced cost of production of the device 120a that provides a specific operation to a mobile system.

As described above, a device 120a according to an exemplary embodiment includes the verification IP 123 adapted to take complete charge of a verification operation for firmware update. The device 120a performs integrity verification and signature certification of a firmware image through a dual verification operation. Also, it is possible to markedly reduce a capacity of the nonvolatile memory 126 for a firmware update using the dual verification operation.

Figure 10:
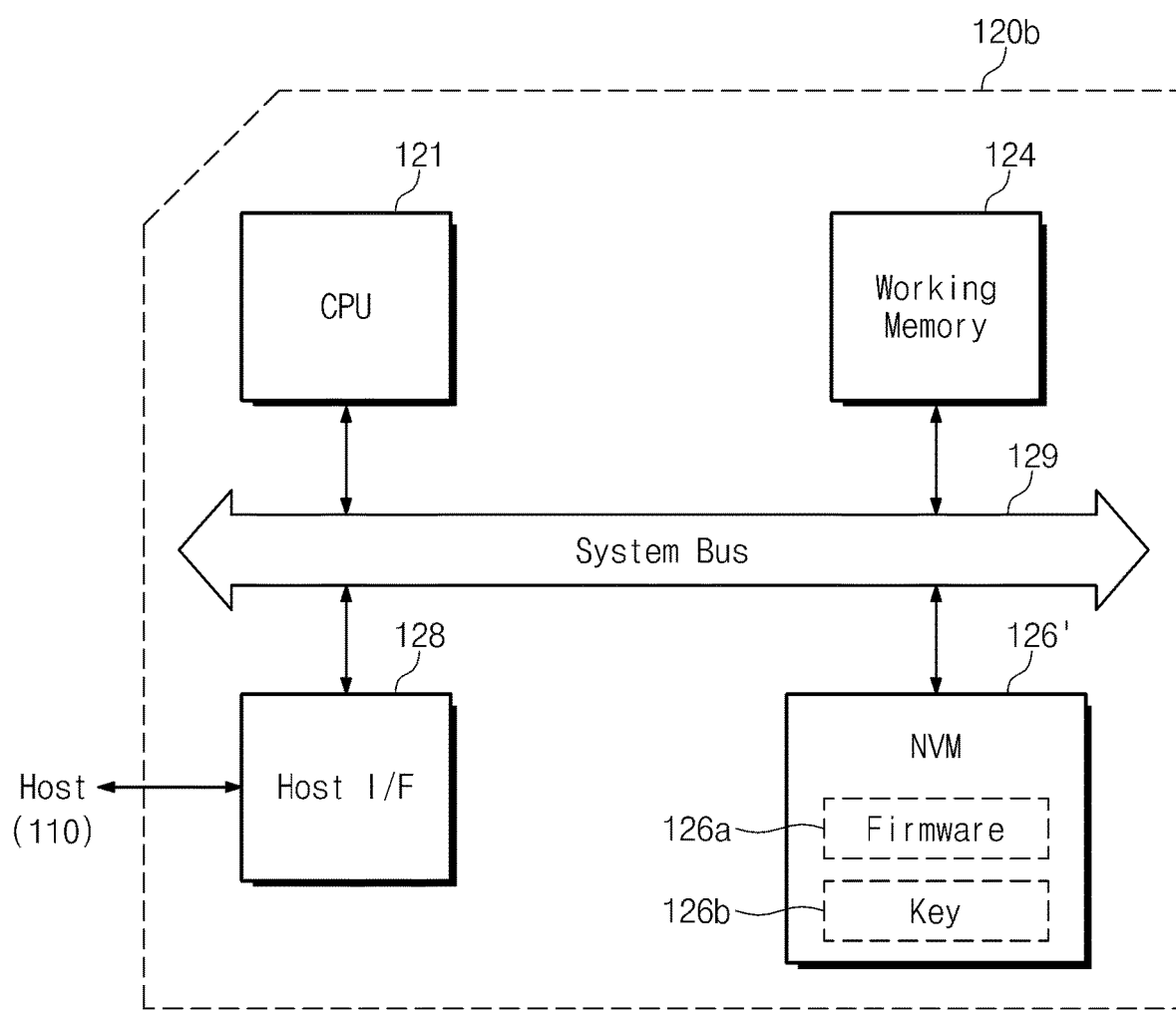
FIG. 10 is a block diagram schematically illustrating a device according to still another exemplary embodiment.

FIG. 10 is a block diagram schematically illustrating a device 120b according to still another exemplary embodiment. Referring to FIG. 10, a device 120b may be implemented with a CPU-based semiconductor device, like a device 120 shown in FIG. 4. The device 120b includes a CPU 121, a working memory 124, a nonvolatile memory 126', and a host interface 128. In FIG. 10, components 121, 124, and 128 that are identical or similar to those shown in FIG. 4 may be marked by the same reference numerals, and a description thereof is therefore omitted below.

The nonvolatile memory 126' stores a firmware image 126a and a public key 126b. That is, the nonvolatile memory 126' has the same or similar operation as a secured storage 127 and a nonvolatile memory 126 shown in FIG. 4. Thus, a memory area of the nonvolatile memory 126' in which the public key 126b is stored may be managed as a secured area.

Figure 11:
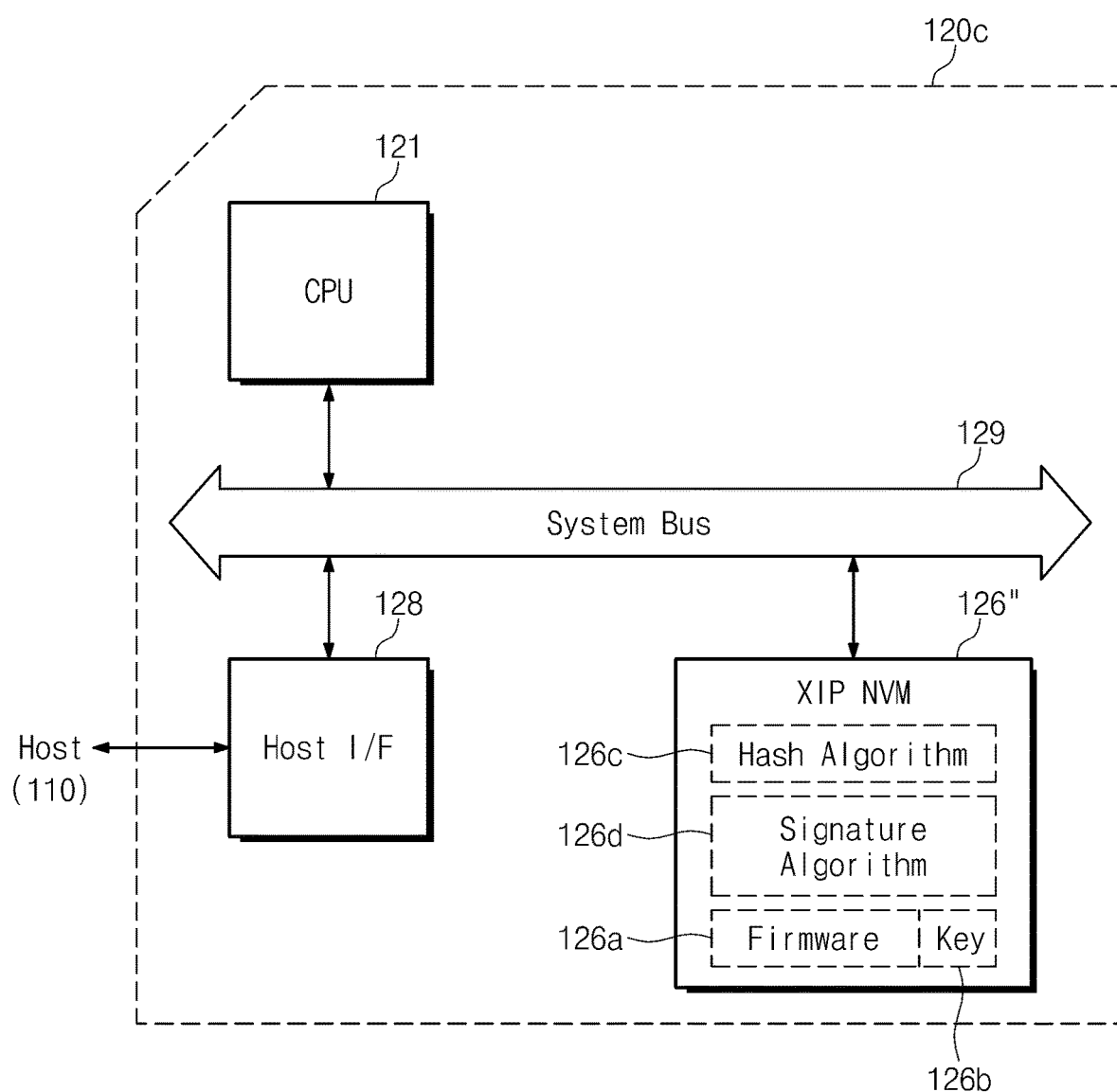
FIG. 11 is a block diagram schematically illustrating a device according to a further exemplary embodiment.

FIG. 11 is a block diagram schematically illustrating a device 120c according to a further exemplary embodiment. Referring to FIG. 11, a device 120c may be implemented with a CPU-based semiconductor device like a device 120 shown in FIG. 4. However, it is well understood that the device 120c may include a hardware IP for executing a verification function of the inventive concept. The device 120c includes a CPU 121, an XIP nonvolatile memory 126", and a host interface 128. In FIG. 11, components 121 and 128 that are identical or similar to those shown in FIG. 4 may be marked by the same reference numerals, and a description thereof is therefore omitted below.

The nonvolatile memory 126" is formed of (e.g., includes) a nonvolatile device with a security function. That is, the nonvolatile memory 126" may be formed of a nonvolatile memory with an XIP function. In this case, a public key 126b, a firmware image 126a, a hash algorithm 126c, and a signature algorithm 126d are stored in the nonvolatile memory 126". In particular, the public key 126b may be stored in a secured area.

Figure 12:
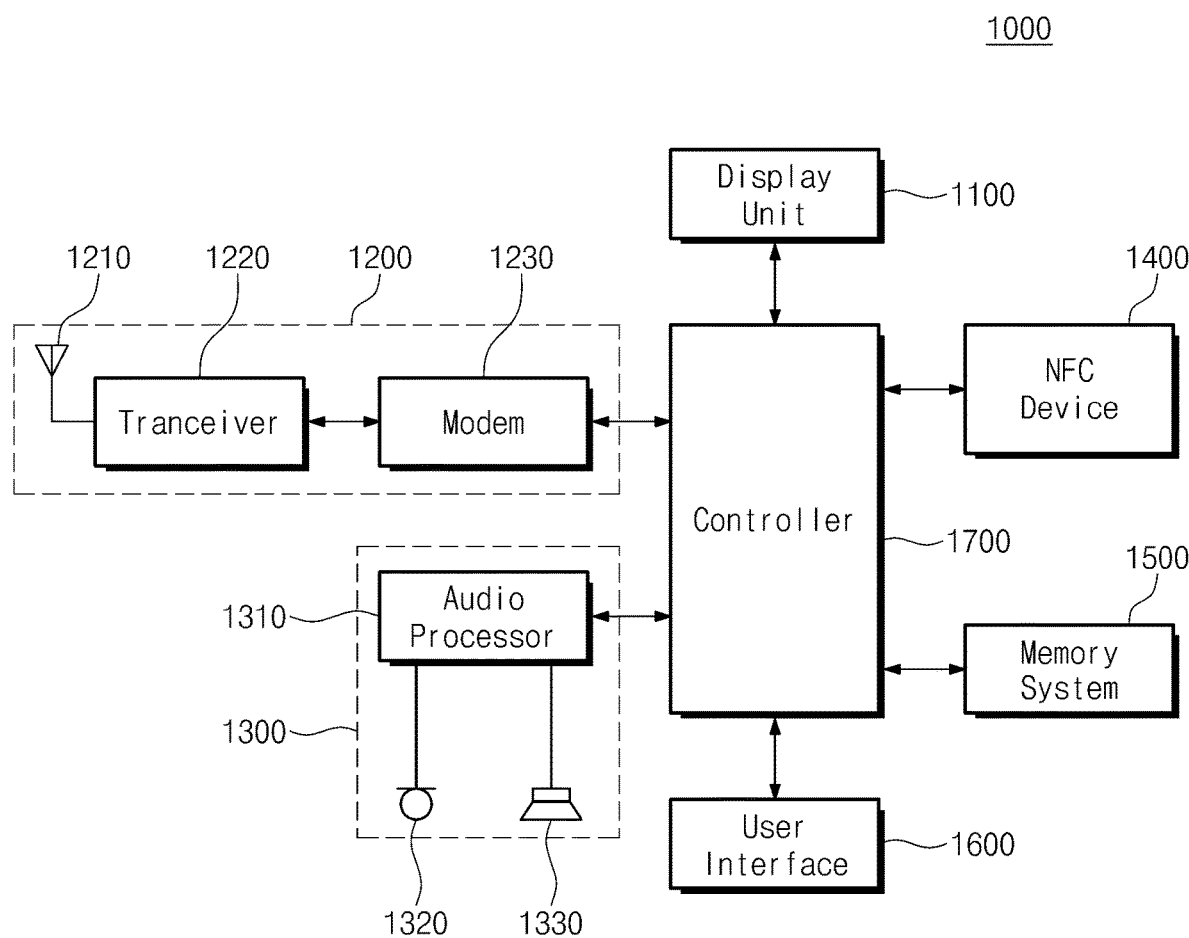
FIG. 12 is a block diagram schematically illustrating a portable terminal according to an exemplary embodiment.

FIG. 12 is a block diagram schematically illustrating a portable terminal according to an exemplary embodiment. Referring to FIG. 12, a portable terminal 1000 according to an exemplary embodiment includes a display unit 1100 (e.g., display), a radio frequency (RF) transceiver unit 1200 (e.g., RF transceiver), an audio processing unit 1300 (e.g., audio processor), an NFC device 1400, a memory system 1500, a user interface 1600, and a controller 1700.

The display unit 1100 displays image information according to a control of the controller 1700. The RF transceiver unit 1200 includes an antenna 1210, a transceiver 1220, and a modem 1230. The audio processing unit 1300 includes an audio processor 1310, a microphone 1320, and a speaker 1330.

The NFC device 1400 may provide mobile financial services, such as credit card, e-money, transportation card, etc. The NFC device 1400 may include a security function for storing personal information and private keys for the mobile financial services and a short-range wireless communication function. A firmware update method of the NFC device 1400 is substantially the same as or similar to that of a mobile system 100 shown in FIG. 1. That is, first, the controller 1700 provides a hash value h1 and a signature Sign to the NFC device 1400 to update firmware for driving the NFC device 1400. Next, the NFC device 1400 performs a pre-verify operation for integrity verification and signature certification on a firmware image. Based on a result of the pre-verify operation, the NFC device 1400 requests a firmware image at the controller 1700. Receiving the firmware image, the NFC device 1400 performs a post-verify operation for generating a hash value from the firmware image and performs integrity verification and signature certification on a firmware image stored in the NFC device 1400. This reinforced security function does not require a rollback of a previous version of the firmware at a firmware update operation. Thus, it is possible to reduce the size of memory for storing firmware.

The memory system 1500 includes a working memory, a storage memory, etc. A mobile DRAM may be used as the working memory, and a nonvolatile memory may be used as the storage memory. For example, the nonvolatile memory is provided in the form of a memory card (e.g., MMC, eMMC, SD, microSD, and so on). The controller 1700 may be implemented with a system-on-a-chip (SoC) for driving an application program, an operating system, etc.

A device and/or a host according to one or more exemplary embodiments may be packaged according to any of a variety of different packaging technologies. Examples of such packaging technologies may include PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses, devices, hosts, components, etc., can include circuitry, a processor, a microprocessor, etc., and may execute a computer program stored in a computer-readable medium.

While exemplary embodiments have been described above, it will be apparent to those skilled in the art that various changes and modifications may be made without departing from the spirit and scope of the present inventive concept. Therefore, it should be understood that the above exemplary-embodiments are not limiting, but illustrative.

What is claimed is:

1. A device included in a mobile system, the device comprising:
   an interface adapted to receive, from a host of the mobile system, a first hash value and a signature, the first hash value generated by the host from a firmware image at the host; and
   a controller adapted to control the interface to receive the firmware image from the host according to a result of a first verify operation for the firmware image using the received first hash value and the received signature,
   wherein the device and the host are both included in a same mobile terminal,
   wherein the controller is adapted to perform the first verify operation for the firmware image using the received first hash value and the received signature,
   wherein the controller is adapted to obtain a second hash value from the received firmware image to perform a second verify operation on the received firmware image, and
   wherein the controller is adapted to obtain the second hash value by calculating the second hash value from the firmware image received from the host, and to compare the received first hash value and the calculated second hash value.

2. The device of claim 1, wherein the first verify operation is for at least one of integrity verification and signature certification of the firmware image at the host, and the second verify operation is for at least one of integrity verification and signature certification on the received firmware image.

3. The device of claim 1, wherein the controller is adapted to perform the first verify operation for the firmware image using the received first hash value and the received signature, without receiving or using the firmware image.

4. The device of claim 1, further comprising a hardware intellectual property adapted to perform the first verify operation for the firmware image using the received first hash value and the received signature.

5. The device of claim 4, wherein the hardware intellectual property is adapted to obtain a second hash value from the received firmware image to perform a second verify operation on the received firmware image.

6. The device of claim 1, further comprising a nonvolatile memory adapted to store the received firmware image or a previous version of the firmware image.

7. The device of claim 6, wherein the nonvolatile memory has a capacity sufficient to store only one of the received firmware image and the previous version of the firmware image at a same time.

8. The device of claim 1, wherein the device comprises a Near Field Communications (NFC) module.

9. The device of claim 6, wherein the nonvolatile memory has a capacity sufficient to store only one of the received firmware image and the previous version of the firmware image at a same time.

10. A method of updating firmware of a device included in a mobile system, the method comprising:
- receiving, from a host, a first hash value and a signature, the first hash value generated by the host from a firmware image at the host;
- performing a first verify operation on the firmware image using the received first hash value and the received signature; and
- receiving the firmware image from the host according to a result of the first verify operation,
- wherein the device and the host are both included in a same mobile terminal,
- wherein the method further comprises calculating a second hash value from the received firmware image and performing a second verify operation on the received firmware image by comparing the received first hash value and the calculated second hash value.

11. The method of claim 10, wherein the first verify operation is for at least one of integrity verification and signature certification of the firmware image at the host, and the second verify operation is for at least one of integrity verification and signature certification on the received firmware image.

12. The method of claim 10, wherein the performing the first verify operation comprises performing the first verify operation for the firmware image using the received first hash value and the received signature, without receiving or using the firmware image.

13. The method of claim 10, wherein the received first hash value is a value obtained from the firmware image by performing a hash operation using a hash algorithm.

14. The method of claim 10, wherein the performing the first verify operation comprises:
- obtaining a third hash value from the received signature according to a signature algorithm; and
- comparing the received first hash value and the obtained third hash value.

15. The method of claim 14, wherein the receiving the firmware image from the host comprises requesting a transfer of the firmware image from the host in response to the received first hash value coinciding with the obtained third hash value according to the comparing.

16. The method of claim 10, wherein the received signature is decoded using a public key while the first verify operation is performed.

* * * * *